United States Patent [19]
Nojima et al.

[11] Patent Number: 5,373,326
[45] Date of Patent: Dec. 13, 1994

[54] CHROMINANCE SIGNAL PROCESSING CIRCUIT FOR A CHROMA-SIGNAL NOISE REDUCER

[75] Inventors: Satoshi Nojima, Kanagawa; Toshitaka Senuma, Tokyo, both of Japan

[73] Assignee: Sony Corporation, Tokyo, Japan

[21] Appl. No.: 39,731

[22] Filed: Mar. 30, 1993

[30] Foreign Application Priority Data

Apr. 2, 1992 [JP] Japan .................... 4-080997

[51] Int. Cl.5 ................ H04N 5/213; H04N 9/64
[52] U.S. Cl. .................... 348/624; 348/620; 348/713
[58] Field of Search ............... 358/21 R, 36, 37, 40, 358/30, 13, 22; 348/348, 708, 624, 621, 630, 713, 660, 472, 620, 578; H04N 9/77, 9/64, 5/213

[56] References Cited

U.S. PATENT DOCUMENTS

| | | | |
|---|---|---|---|
| 4,868,764 | 9/1989 | Richards | 358/30 |
| 4,910,586 | 3/1990 | Sharpe | 358/13 |
| 5,047,838 | 9/1991 | Murakami | 358/13 |
| 5,140,408 | 8/1992 | Kaite | 358/21 R |

Primary Examiner—James J. Groody
Assistant Examiner—Sherrie Hsia
Attorney, Agent, or Firm—Jay H. Maioli

[57] ABSTRACT

A signal from an input terminal (1) is supplied to a video signal processing circuit (2) which derives a carrier chrominance signal. The carrier chrominance signal is supplied through a low-pass filter (3) to an A/D converter circuit (4). A signal converted by the A/D converter circuit (4) is supplied to a bandpass filter (5) which limits the band of the chrominance signal. A signal from the bandpass filter (5) is supplied to a decoder circuit (6) which alternately derives color difference signals (R-Y) and (B-Y). The signal from the decoder circuit (6) is supplied to a decimation filter (7) which effects a decimation. The signal thus decimated is supplied to a multiplexer (8) and thereby generated as 2-bit series data. A signal from the multiplexer (8) is supplied to a CNR (chroma noise reducer) circuit (9). Thus, the number of bits can be reduced without reducing the number of lines of a chroma signal and data gradation.

5 Claims, 2 Drawing Sheets

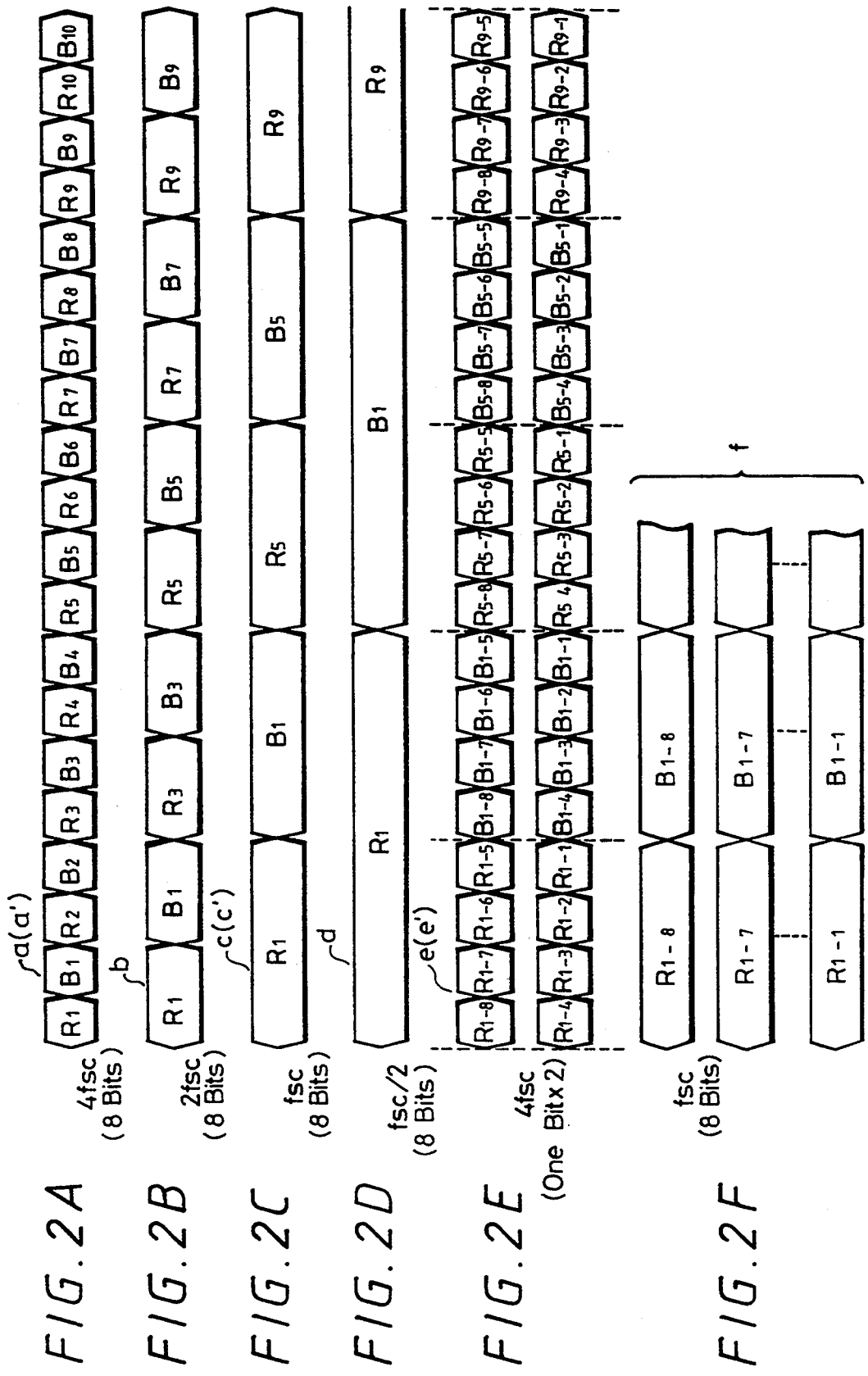

CHROMINANCE SIGNAL PROCESSING CIRCUIT FOR A CHROMA-SIGNAL NOISE REDUCER

BACKGROUND OF THE INVENTION

1. Field of the Invention

The present invention relates to a chrominance signal processing circuit that processes a chrominance signal by using a semiconductor field memory for use in a field/frame CNR (chroma noise reducer).

2. Description of the Related Art

In a field/frame CNR that reduces random noise contained in a chrominance signal or the like, an analog chrominance signal is converted to a digital signal. Then, the digital signal is written in a field/frame memory and noise is reduced by effectively utilizing an interfield/interframe correlation of a video signal.

When the analog chrominance signal is converted in the form of analog to digital signal, a sampling frequency for the A/D (analog-to-digital) conversion is 4 fsc (fsc is a color subcarrier frequency) that is the same as the sampling frequency used when a luminance signal, for example, is subjected to a sampling processing. Therefore, when such chrominance signal is written in the above memory, if the number of samples of chroma signal on one line is 910 samples, the number of memory lines is 250 lines and a data gradation is formed of 8 bits, then a memory having a large capacity of about 1.8 Mbits is required and a chrominance signal processing circuit becomes expensive.

To remove the aforesaid drawback, it has been proposed that the amount of data be reduced to ½ by writing a chroma signal in a memory at every other line in the vertical direction and that the number of bits of the memory be reduced by forming a data gradation by 4 bits. These previously-proposed methods cannot overcome the above defects. That is, if the number of lines written in the memory is reduced, then a so-called dither occurs in an oblique portion of a picture when a reproduced signal is reproduced on a picture screen of a television monitor. Further, if the data gradation is reduced, then there occur various problems that a color cannot be reproduced with high definition. The problems that the present invention intends to solve are as follows. That is, when the chroma signal is processed by using the memory, if the number of lines written in the memory is reduced and the data gradation is reduced in order to reduce the number of bits of the memory, there are then various problems that the definition of a reproduced chroma signal is deteriorated and that a distortion occurs.

OBJECTS AND SUMMARY OF THE INVENTION

In view of the aforesaid problems, it is an object of the present invention to provide a chrominance signal processing circuit for a chroma-signal noise reducer in which the definition of a reproduced chroma signal can be prevented from being deteriorated.

It is another object of the present invention to provide a chrominance signal processing circuit for a chroma-signal noise reducer in which a distortion of a reproduced chroma signal can be avoided.

According to an aspect of the present invention, there is provided a chrominance signal processing circuit which comprises an analog-to-digital converter for sampling a chroma signal at a predetermined sampling frequency, a decoder circuit for decoding the analog-to-digital converted signal to extract color difference signals having the predetermined sampling frequency, a decimation filter for decimating the color difference signals to a frequency of 1/n (n is a 2's power), a memory processing circuit for writing therein the decimated signal at every predetermined bit, processing the written signal in an arbitrary processing fashion, and reading out the processed signal at every predetermined bit, and an interpolation circuit for interpolating the read-out signal to derive signal values at the predetermined sampling frequency.

According to the chrominance signal processing circuit of the present invention, since data that results from decimating a sampling frequency of a signal to 1/n once by the decimation means is written in the memory and the read-out signal is interpolated by the interpolation means to the original sampling frequency, the number of bits of the memory can be reduced without reducing the number of lines of the chroma signal and also without reducing the data gradation.

The above and other objects, features, and advantages of the present invention will become apparent from the following detailed description of illustrative embodiments thereof to be read in conjunction with the accompanying drawings.

BRIEF DESCRIPTION OF THE DRAWINGS

FIGS. 2A through 2F are respectively diagrams used to explain an operation of the chrominance signal processing circuit shown in FIG. 1.

DETAILED DESCRIPTION OF THE PREFERRED EMBODIMENTS

Figure 1:
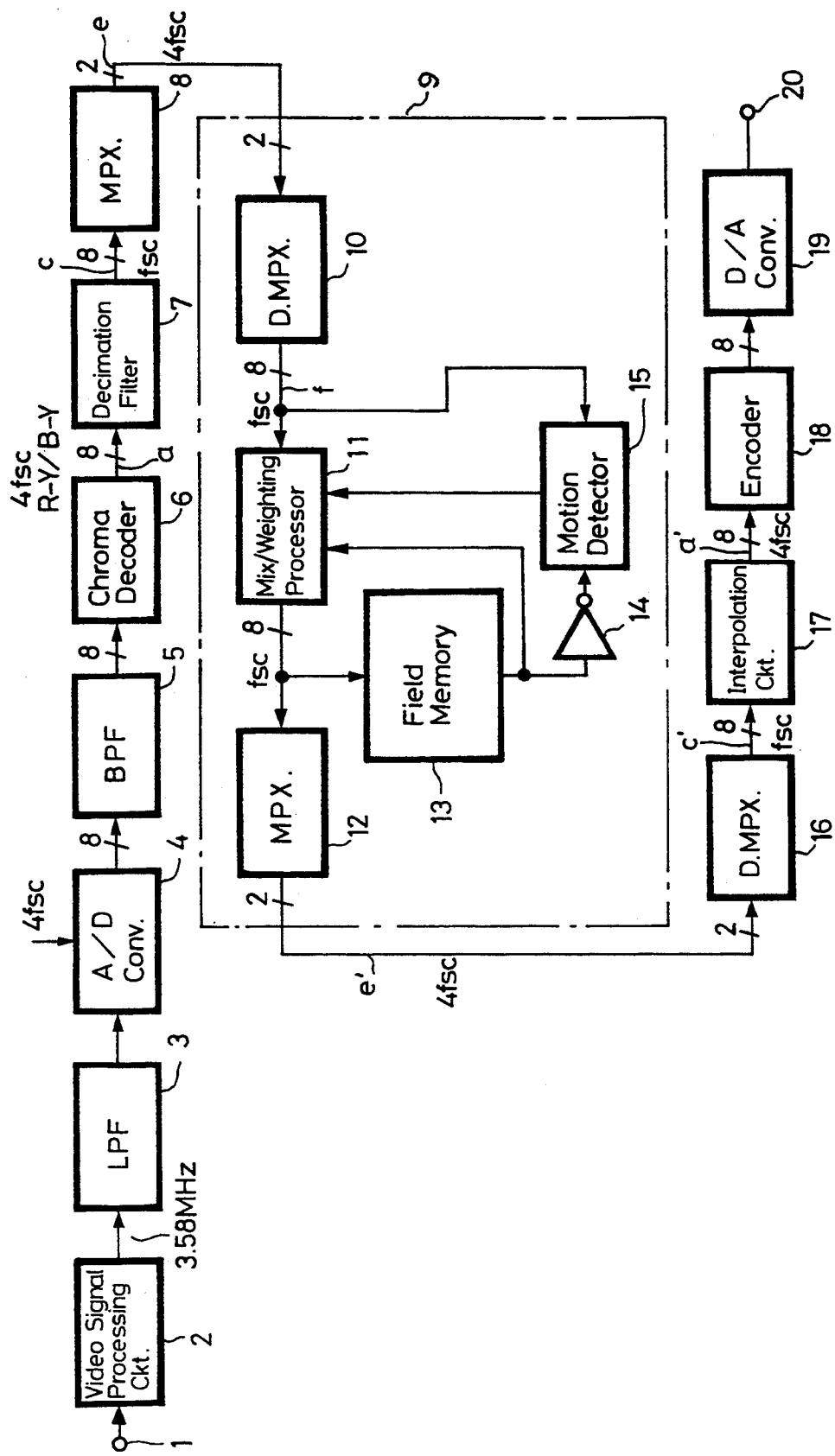
FIG. 1 is a block diagram showing a chrominance signal processing circuit according to an embodiment of the present invention.

The present invention will now be described with reference to the drawings.

As shown in FIG. 1, there is provided an input terminal 1 to which there is supplied a down-converted chroma signal which is converted from a high frequency band to a lower band of an occupied band of an FM (frequency-modulated) luminance signal. The chroma signal from the input terminal 1 is supplied to a video signal processing circuit 2, in which it is processed in some suitable signal processing fashion such as an elimination of a crosstalk component between the chroma signal and the luminance signal by a comb filter, an up-conversion in which the chroma signal is reconverted into the original high frequency band (e.g., around 3.58 MHz in the case of the NTSC signal) or the like. Thus, a so-called carrier chrominance signal is output from the video signal processing circuit 2. The carrier chrominance signal is supplied through a lowpass filter (LPF) 3 to an A/D (analog-to-digital) converter circuit 4. The luminance signal reproduced by the video signal processing circuit 2 will not be described.

A signal converted into an 8-bit digital signal by the A/D converter circuit 4 at a sampling frequency 4 fsc, for example, is supplied to a bandpass filter (BPF) 5 that limits a band of a chroma signal to a band width of about 506 kHz. A signal from the bandpass filter 5 is supplied to a chroma decoder 6 which alternately derives color difference signals R-Y and B-Y at the sampling frequency 4 fsc, for example.

A signal from the chroma decoder 6 is supplied to a decimation filter 7 that constructs a decimation means. The color difference signal having the sampling frequency 4 fsc is decimated to a ¼ sampling frequency fsc by the decimation filter 7. A decimated signal c (8 bits) from the decimation filter 7 is supplied to a multiplexer (MPX) 8 having a parallel-to-serial conversion function from which a signal is output in the form of 2-bit series data at the rate of 4 fsc (see FIG. 2E).

The 2-bit series signal e from the multiplexer 8 is supplied to a CNR (chroma noise reducer) circuit 9. In the CNR circuit 9, a demultiplexer (D.MPX.) 10 that converts data in the form of serial to parallel data is provided at the input end to reconvert signals, which are supplied to the above input end in the form of 2-bit series data, into an 8-bit parallel signal f. A signal from the demultiplexer 10 is supplied to a mixer/weighting processor 11.

A signal from the mixer/weighting circuit 11 is supplied to a multiplexer 12 coupled to an output end of the CNR circuit 9 and which converts data in the form of parallel to serial data. This signal is further supplied to a field memory 13 having a storage capacity of 544 kbits, for example. The signal from the field memory 13, which is inverted by an inverter 14, and the signal from the demultiplexer 10 are fed to a motion detector 15.

A signal from the motion detector 15 and the signal from the field memory 13 are supplied to the mixer/weighting circuit 11, whereby a noise reduction processing is effected by making effective use of an interfield correlation of the chroma signal, for example. As described above, the multiplexer 12 connected to the output end of the CNR circuit 9 is supplied with the signal whose noise is reduced. Thus, 2-bit series data are output from the multiplexer 12.

The processing in the mixer/weighting circuit 11, the field memory 13 and the motion detector 15 is the same as that of the prior art and operation thereof will be described in brief. A correlation between a signal of an arbitrary field and a signal of the next field is detected by the motion detector 15. Then, these two field signals are mixed with a mixing ratio corresponding to the magnitude of a correlation by the mixer/weighting circuit 11. A mixed signal is stored in the field or frame memory 13 as a new television signal. These operations are repeated. Accordingly, as far as a signal whose motion is small is concerned, the level of a noise component can be lowered without lowering the level of the signal component, which as a result can improve a signal-to-noise ratio (S/N).

A signal e' from the multiplexer 12 is supplied to a demultiplexer 16 which reconverts a signal, which is supplied in the form of 2-bit series data, into an 8-bit parallel signal c' of fsc rate. This signal is supplied to an interpolation filter 17 constituting an interpolation means, in which it is reconverted into a color difference signal having a sampling frequency 4 fsc, for example, by the interpolation.

A signal from the interpolation filter 17 is supplied to an encoder 18 which encodes the color difference signal to provide a carrier chrominance signal of 3.58 MHz band. The carrier chrominance signal from the encoder 18 is supplied through a digital-to-analog (D/A) converter circuit 19 and then developed at an output terminal 20.

As described above, according to the chrominance signal processing circuit of the present invention, the sampling frequency of the signal is decimated to 1/n (n is 2's power) by the decimation means (decimation filter 7) and written in the memory (field memory 13). Then, the signal read out from the memory is interpolated by the interpolation means (interpolation filter 17) to provide the signal having the original sampling frequency. Therefore, the number of bits of the memory can be reduced (from 1.8 Mbits to 544 kbits) without reducing the number of lines of the chroma signal and without reducing the data gradation.

More specifically, the chroma decoder 6 alternately derives 8-bit color difference signals R-Y (indicated by $R_N$) and B-Y (indicated by $B_N$) having a sampling frequency of 4 fsc, for example, as shown in FIG. 2A. This signal is supplied to the decimation filter 7, in which it is decimated to ¼ (sampling frequency is fsc), for example, as shown in FIG. 2C. That is, $R_1$, $B_1$, $R_3$, $B_3$, ... of the output a of the chroma decoder 6 are latched to form the signal data c.

As other embodiments, FIG. 2B shows the case that the signal is decimated to ½ (sampling frequency is 2 fsc), and FIG. 2D shows the case that the signal is decimated to ⅛ (sampling frequency is fsc/2). Study of experimental results reveals that the decimation ratio can be increased to about 1/16 (sampling frequency is fsc/4). In the CNR circuit 9 using the above motion detector 15, there can be provided the decimation ratio of ⅛ (sampling frequency is fsc/2) at maximum.

Further, the 8-bit signal c, decimated to ¼ (sampling frequency is fsc), is supplied to the multiplexer 8 which derives 2-bit series data e at a timing of the sampling frequency 4 fsc as shown in FIG. 2E. The left-hand part of the subscript of the 2-bit series data represents the bit number of the original data a and the right-hand part represents the bit number of newly generated 8-bit data.

In the chrominance signal processing circuit of the present invention, a signal can be received from and supplied to the CNR circuit 9 via a 2-bit signal line. Thus, since the chrominance signal processing circuit of the present invention includes the field memory 13, there can be achieved the effect that an interface such as wiring or the like relative to the CNR circuit 9, which is fabricated by the IC different from those of the circuits 2 to 8 and the circuits 16 to 19, can be simplified in structure. Further, the calculation timing can be selected arbitrarily and a delay time of the chrominance signal relative to the luminance signal can be adjusted satisfactorily. The reason that the signal is converted into the 2-bit series data of 4 fsc rate by using the multiplexers 8, 12 and the demultiplexers 10, 16 is to simplify the interface relative to the CNR circuit 9. In this case, if the output of the decimation filter 7 is directly connected to the CNR circuit 9 and the output of the CNR circuit 9 is directly connected to the interpolation filter 17, there is then the effect that the number of bits of the field memory 13 can be reduced. Furthermore, the field memory 13 can be replaced with the frame memory. The chrominance signal processing circuit of the present invention is not limited to the CNR circuit and may be applied to a memory processing circuit that utilizes another field/frame memory.

According to the present invention, since data that results from decimating a sampling frequency of a signal to 1/n once by the decimation means is written in the memory and the read-out signal is interpolated by the interpolation means to the original sampling frequency, the number of bits of the memory can be reduced without reducing the number of lines of the chroma signal and also without reducing the data gradation.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A chrominance signal processing circuit comprising:
    an analog-to-digital converter for sampling a chroma signal at a predetermined sampling frequency and for outputting a digital chroma signal;
    a decoder circuit for decoding said digital chroma signal to extract color difference signal values having said predetermined sampling frequency;
    a decimation filter for decimating said color difference signal values to a frequency of 1/n (n is an integer and a 2's power) and for outputting a decimated signal;
    a memory processing circuit for writing therein said decimated signal at every predetermined bit, processing the written decimated signal in an arbitrary processing fashion, and reading out the processed decimated signal at every predetermined bit as a read-out signal;
    said memory processing circuit including a chroma noise reducer circuit comprising a field or frame memory, a motion detector, and a mixer/weighing circuit; and
    an interpolation circuit for interpolating the read-out signal to derive said color difference signal values at said predetermined sampling frequency.

2. The chrominance signal processing circuit according to claim 1 in which said memory processing circuit further includes a multiplexer for decreasing a transmission bit connected between said decimation filter and said chroma noise reducer circuit and a demultiplexer for increasing a transmission bit connected between said chroma noise reducer circuit and said interpolation circuit.

3. The chrominance signal processing circuit according to claim 2 in which a data rate of input data to said decimation filter is selected to be 4 fsc and an output thereof is decimated to between 2 fsc and fsc/4, where fsc represents a chroma subcarrier frequency.

4. The chrominance signal processing circuit according to claim 3 in which said multiplexer converts parallel 8-bit data into 2-bit serial data.

5. The chrominance signal processing circuit according to claim 4 in which said parallel 8-bit data is data having a transmission rate of fsc and said 2-bit serial data is data having a transmission rate of 4 fsc.

* * * * *